(12) United States Patent
Komano (10) Patent No.: US 9,239,972 B2
(45) Date of Patent: Jan. 19, 2016

(54) RECORDING APPARATUS

(75) Inventor: Yusuke Komano, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 826 days.

(21) Appl. No.: 12/957,848

(22) Filed: Dec. 1, 2010

(65) Prior Publication Data

US 2011/0211201 A1 Sep. 1, 2011

(30) Foreign Application Priority Data

Feb. 26, 2010 (JP) .................................. 2010-041653

(51) Int. Cl.
 *B41J 2/205* (2006.01)
 *G06K 15/10* (2006.01)

(52) U.S. Cl.
 CPC .................................... *G06K 15/105* (2013.01)

(58) Field of Classification Search
 CPC ............ B41J 2/205; B41J 2/21; B41J 2/2054; B41J 2/2052; B41J 2/2132; G06K 15/102
 USPC ............ 347/9–12, 15, 20; 358/3.23, 3.01–3.1
 See application file for complete search history.

(56) References Cited

U.S. PATENT DOCUMENTS

| | | | | |
|---|---|---|---|---|
| 6,830,301 B2 * | 12/2004 | Hayasaki | ........................... | 347/9 |
| 7,385,730 B2 * | 6/2008 | Ogasahara et al. | .......... | 358/3.01 |
| 2003/0030824 A1 * | 2/2003 | Ogasahara et al. | ............ | 358/1.8 |
| 2004/0104952 A1 * | 6/2004 | Tsuchiya et al. | ................ | 347/15 |
| 2006/0279595 A1 * | 12/2006 | Hoshiyama et al. | ............ | 347/14 |
| 2007/0188539 A1 * | 8/2007 | Saruta | .............................. | 347/19 |
| 2007/0285451 A1 * | 12/2007 | Noguchi | .......................... | 347/12 |
| 2008/0309952 A9 * | 12/2008 | Billow et al. | .................. | 358/1.8 |
| 2009/0059248 A1 * | 3/2009 | Uemura et al. | ................ | 358/1.8 |
| 2009/0161131 A1 | 6/2009 | Fujimoto et al. | | |
| 2010/0046011 A1 * | 2/2010 | Tripp | ............................. | 358/1.8 |

FOREIGN PATENT DOCUMENTS

| | | |
|---|---|---|
| JP | 2008-087289 A | 4/2008 |
| JP | 2009-166474 A | 7/2009 |

\* cited by examiner

*Primary Examiner* — Stephen Meier
*Assistant Examiner* — Scott A Richmond
(74) *Attorney, Agent, or Firm* — Canon U.S.A., Inc. IP Division (57) ABSTRACT

A recording apparatus is capable of forming an image on a recording medium by using a recording head including first and second recording element arrays for one color component wherein each recording element array includes a plurality of recording elements arranged therein. To perform, in a short time, processes including converting of multilevel data to binary data and assigning of the binary data to the recording element arrays, a multilevel data buffer stores multilevel data, a reading unit reads the multilevel data stored in the multilevel data buffer, and a production unit produces binary data from the multilevel data by using a code table including a plurality of code sets depending on a gray level wherein each code set includes codes corresponding to the first and second recording element arrays. A transferring unit transfers the binary data produced by the production unit to corresponding recording element arrays.

14 Claims, 7 Drawing Sheets

RECORDING APPARATUS

BACKGROUND OF THE INVENTION

1. Field of the Invention

The present invention relates to a circuit that processes image data used in recording an image.

2. Description of the Related Art

Japanese Patent Laid-Open No. 2009-166474 discloses a technique in which multilevel image data is converted into dot data (binary data) assigned to dots in each scanning line to suppress degradation in image quality, which can occur when a recording apparatus records an image by a recording head using a multipath recording scheme. In this technique disclosed in Japanese Patent Laid-Open No. 2009-166474, after the image data is converted into dot data, the dot data is divided into data for each scanning line, and the resultant dot data is sent to the recording head. The recording head records an image in accordance with the received dot data.

However, in the technique disclosed in Japanese Patent Laid-Open No. 2009-166474, the dot data is produced via a process including two steps, i.e., the original image data is first converted into dot data, and then the dot data is divided into data for each scanning line, which causes a limit on a reduction in a processing time.

SUMMARY OF THE INVENTION

According to an aspect of the present invention, there is provided a recording apparatus configured to form an image on a recording medium by using a recording head including first and second recording element arrays for one color component, each recording element array including a plurality of recording elements arranged therein, the recording apparatus including a multilevel data buffer configured to store multilevel data, a reading unit configured to read the multilevel data stored in the multilevel data buffer, a production unit configured to produce a plurality of pieces of binary data corresponding to the first and second recording element arrays based on the multilevel data of one pixel read by the reading unit and based on a code table including a plurality of code sets each including codes corresponding to the first and second recording element arrays, and a transferring unit configured to transfer the binary data produced by the production unit to corresponding recording element arrays.

Further features of the present invention will become apparent from the following description of exemplary embodiments with reference to the attached drawings.

DESCRIPTION OF THE EMBODIMENTS

Figure 1A:
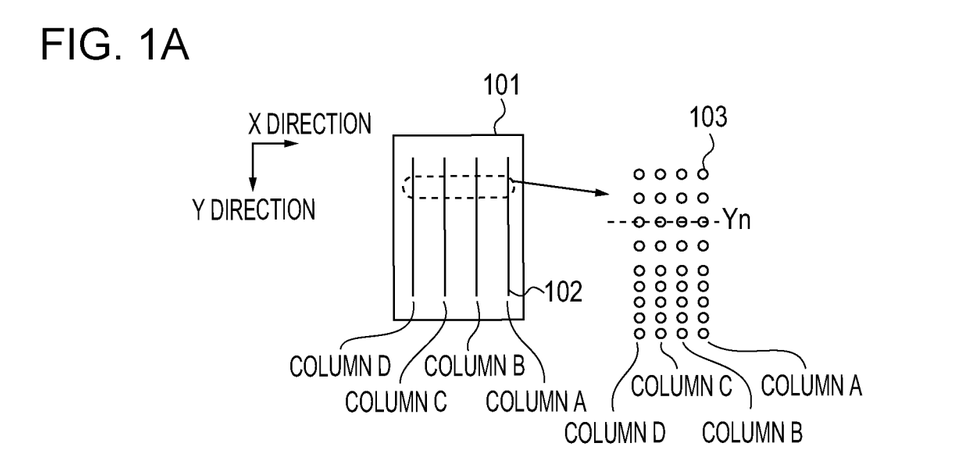
FIGS. 1A to 1C are diagrams illustrating recording heads.
Figure 1B:
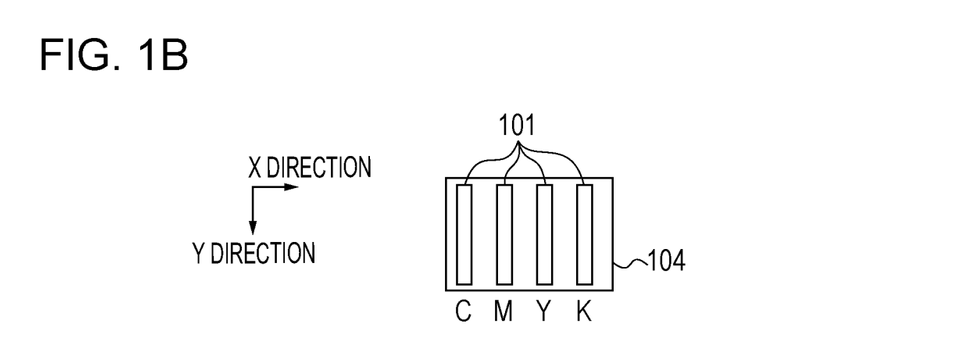

FIG. 1A illustrates a recording head 101. The recording head 101 includes four recording element arrays 102 (array A, array B, array C, and array D). Each recording element array 102 includes a plurality of recording elements 103. Each recording element 103 includes an electro-thermal transducer configured to discharge ink via a nozzle corresponding to the recording element. In FIG. 1A, a portion surrounded by a dotted line is shown in an enlarged manner on the right side to illustrate details thereof. As can be seen, recording elements 103 of each array are arranged in a Y direction. Note that the recording element arrays 102 are disposed such that corresponding recording elements 103 of the array A, the array B, the array C, and the array D are located at the same position as measured in the Y direction. Therefore, for example, when four dots are recorded by four recording elements located in a line (represented by a dotted line) Yn, the resultant four dots recorded by these recording elements are located in a single line. The recording element arrays 102 are arranged side by side in a X direction. This recording head 101 may be used to record one color component, i.e., one color component of an image is recorded by the four recording element arrays 102 of the recording head 101. To form a full color image, a recording head unit 104 is used which includes four recording heads 101 for four colors (cyan, magenta, yellow, and black) configured in a manner shown in FIG. 1B. A full-line recording head unit 105 may be realized by disposing four recording heads 101 in a manner shown in FIG. 1C.

Figure 2:
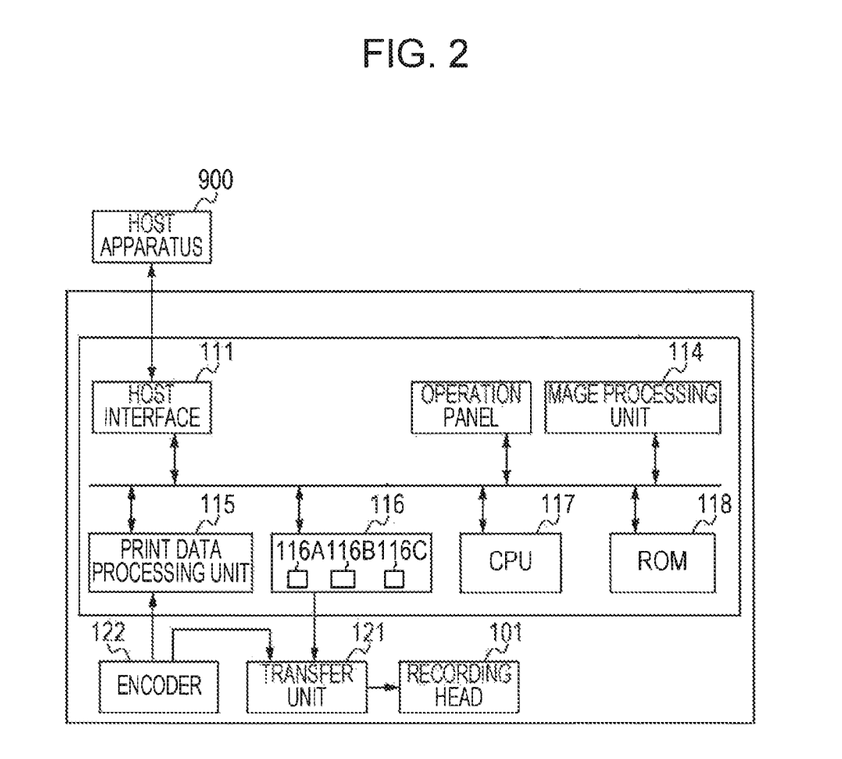
FIG. 2 is a block diagram illustrating a recording apparatus.

FIG. 2 is a block diagram illustrating a recording apparatus. A host interface 111 is an interface for inputting image data in a JPEG format from a host apparatus 900. The image data is stored in a receive buffer 116A (DRAM) in a RAM 116. An image processing unit 114 converts the image data in the JPEG format into multilevel data MD of CMYK color components, and stores the resultant data in a multilevel data buffer 116B (DRAM) in the RAM 116. A print data processing unit 115 converts the multilevel data MD into dot data DD, and stores the resultant dot data DD in a dot data buffer (SRAM) 116C. A data transfer unit 121 transfers the binary data stored in the dot data buffer 116C to the recording head 101. The data transfer unit 121 also has a function of thinning the binary data as well as the function of transferring the data. A signal output from an encoder 122 is sent to the print data processing unit 115 or the data transfer unit 121. A CPU 117 controls operations including driving of recording elements, conveying paper, etc., according to a control program stored in a ROM 118. For the purpose of simplicity, it is assumed that each recording element array includes 48 recording elements. Note that recording elements are arranged in the Y direction, and paper is conveyed in the X direction.

Figure 3:
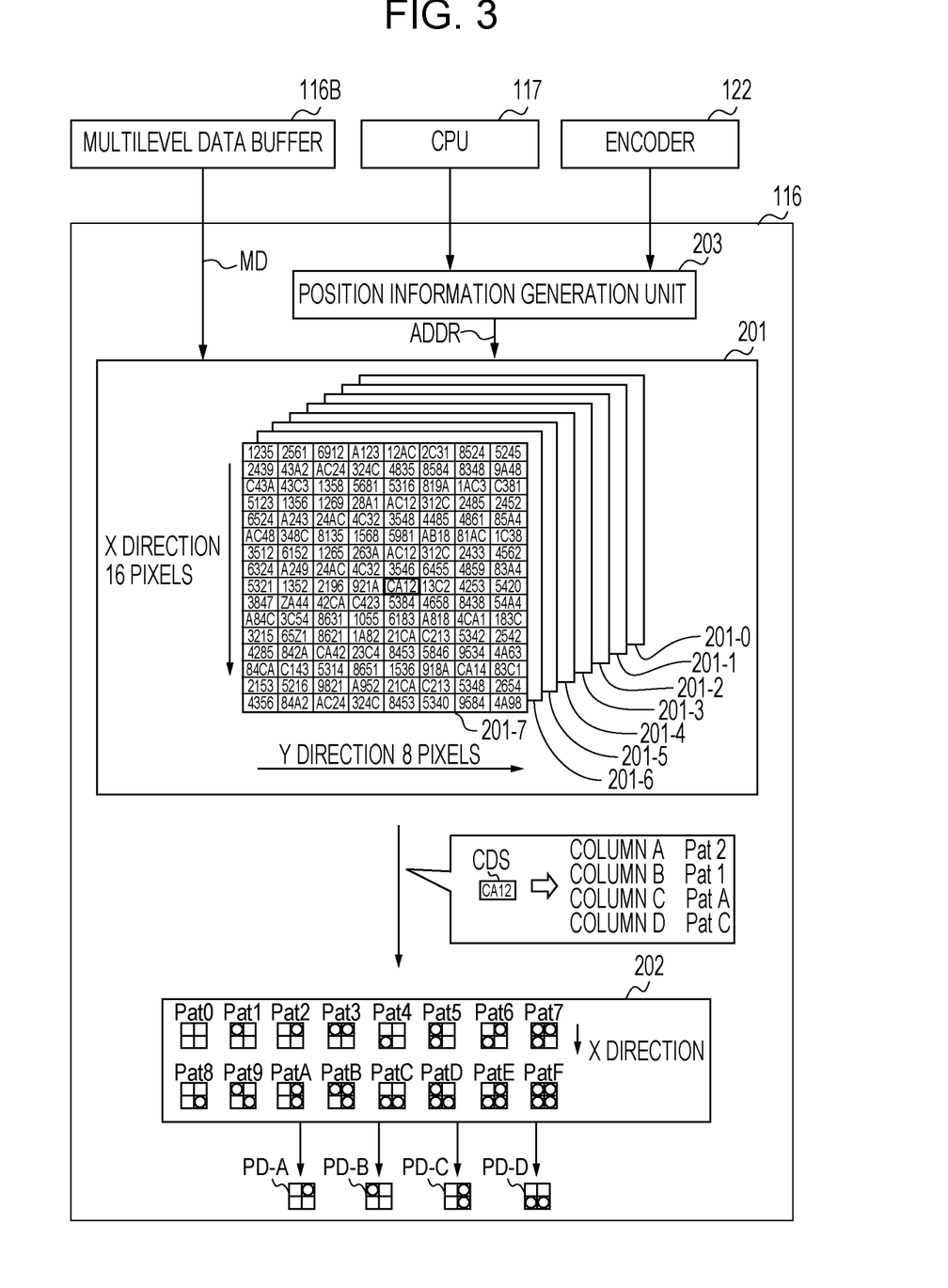
FIG. 3 is a diagram illustrating a concept of a process performed by a print data processing unit.

FIG. 3 illustrates a concept of image data processing (conversion from multilevel data into binary data) performed by the print data processing unit 115. For simplicity of illustration, the process is described below for only one color component. The print data processing unit 115 includes a code table 201, a pattern table 202, and a position information generation unit 203. The position information generation unit 203 generates position information, for example, such that information associated with a position in the X direction is generated based on a signal supplied from the CPU 117, and information associated with a position in the Y direction is generated based on a signal supplied from the encoder 122. The print data processing unit 115 receives multilevel data MD and address information associated with the multilevel data from the outside, and produces four pieces of pattern data PD (PD-A, PD-B, PD-C, and PD-D) using the code table 201 and the pattern table 202. The pattern data PD-A is for the recording element array A (also referred to simply as the array A), and the pattern data PD-B is for the recording element array B (also referred to simply as the array B). The pattern data PD-C is for the recording element array C (also referred to simply as the array C), and the pattern data PD-D is for the recording element array D (also referred to simply as the array D). Note that these four pieces of pattern data PD are produced from one piece of multilevel data MD. Each piece of pattern data PD includes two pieces of dot data DD (binary data) in a vertical direction (in the X direction) and two pieces of dot data DD in a horizontal direction (in the Y direction) and thus each piece of pattern data PD includes four pieces of dot data DD in total. Therefore, the pattern data is also referred to as a dot pattern. The pattern data PD has a resolution of 1200 dpi (dots per inch) in both X and Y directions. Thus, dot data DD for the four arrays is produced from one piece of multilevel data MD. In other words, 16 pieces of dot data are produced from one piece of multilevel data MD. In FIG. 3, open circles in pattern data indicate dots that are to be recorded with ink, while dots with no circles are not recorded with ink.

Next, the code table 201 is explained below using as an example a table 201-7 of gray level 7. The table 201-7 includes 16 (in the X (vertical) direction)×8 (in the Y (horizontal) direction) code sets CDS. That is, the code table 201 includes a plurality of tables each including a plurality of code sets CDS. In a case where image data has a size greater than a table size, an address of the code table 201 is determined by performing a predetermined calculation. The image data has a resolution of 600 ppi (pixels per inch) in both X and Y directions. The image data takes one of eight gray levels from level 0 to level 7. Each code set CDS includes four codes each represented in binary data. One code set is selected based on one piece of position information of the image data. For example, in the table 201-7 of level 7, a code set at a pixel location indicated by a thick-line box in FIG. 3 has codes "C", "A", "1", "2". These codes are used as data codes for the recording element arrays A to D in a predetermined order (from right to left). More specifically, code "2" is assigned to the array A, "1" to the array B, "A" to the array C, and "C" to the array D. Each code is expressed in hexadecimal using 4-bit data. For example, code "1" is expressed as "0001", "2" is expressed as "0010", "A" is expressed as "0100", and "C" is expressed as "1100". In the present embodiment, to read a code set CDS in a short time, the code table 201 is accessed in units of 16 bits. By selectively reading code sets from the plurality of code sets in the code table in the above-described manner, it becomes possible to achieve high dispersibility of dots. By assigning different values to codes in each code set, it becomes possible to achieve still higher dispersibility of dots.

Note that a reference address of the table 201-7 is defined at an upper left location at which "1235" is assigned. In a case where position (address) information indicating a 1000th pixel position in the X direction and a 100th pixel position in the Y direction is input to the position information generation unit 203, the position information generation unit 203 generates a signal ADDR specifying the address of the thick-line box on the table shown in FIG. 3. On the table, this address indicates a pixel at a 9th position in the X direction and a 5th position in the Y direction. More specifically, the position information generation unit 203 determines the address by performing a calculation (1000−16×62+1=9) in the X direction and a calculation (100−8×12+1=5) in the Y direction. Similar code sets are defined for each of other tables 201-0 to 201-6 so that a code set CDS can be selected based on the gray level and the position (address) information associated with the multilevel data.

Figure 4:
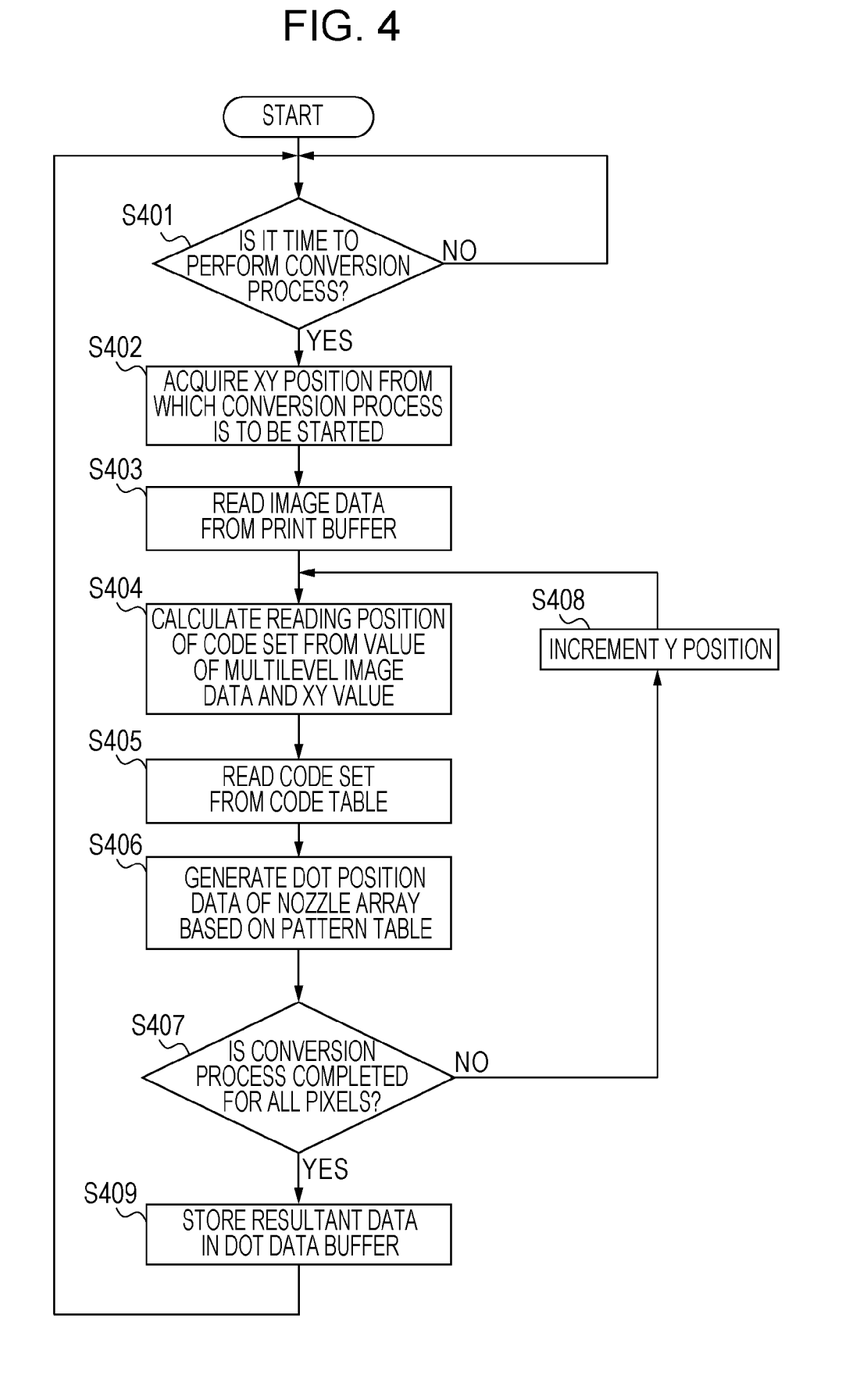
FIG. 4 is a flow chart illustrating a process performed by a print data processing unit.
Figure 6:
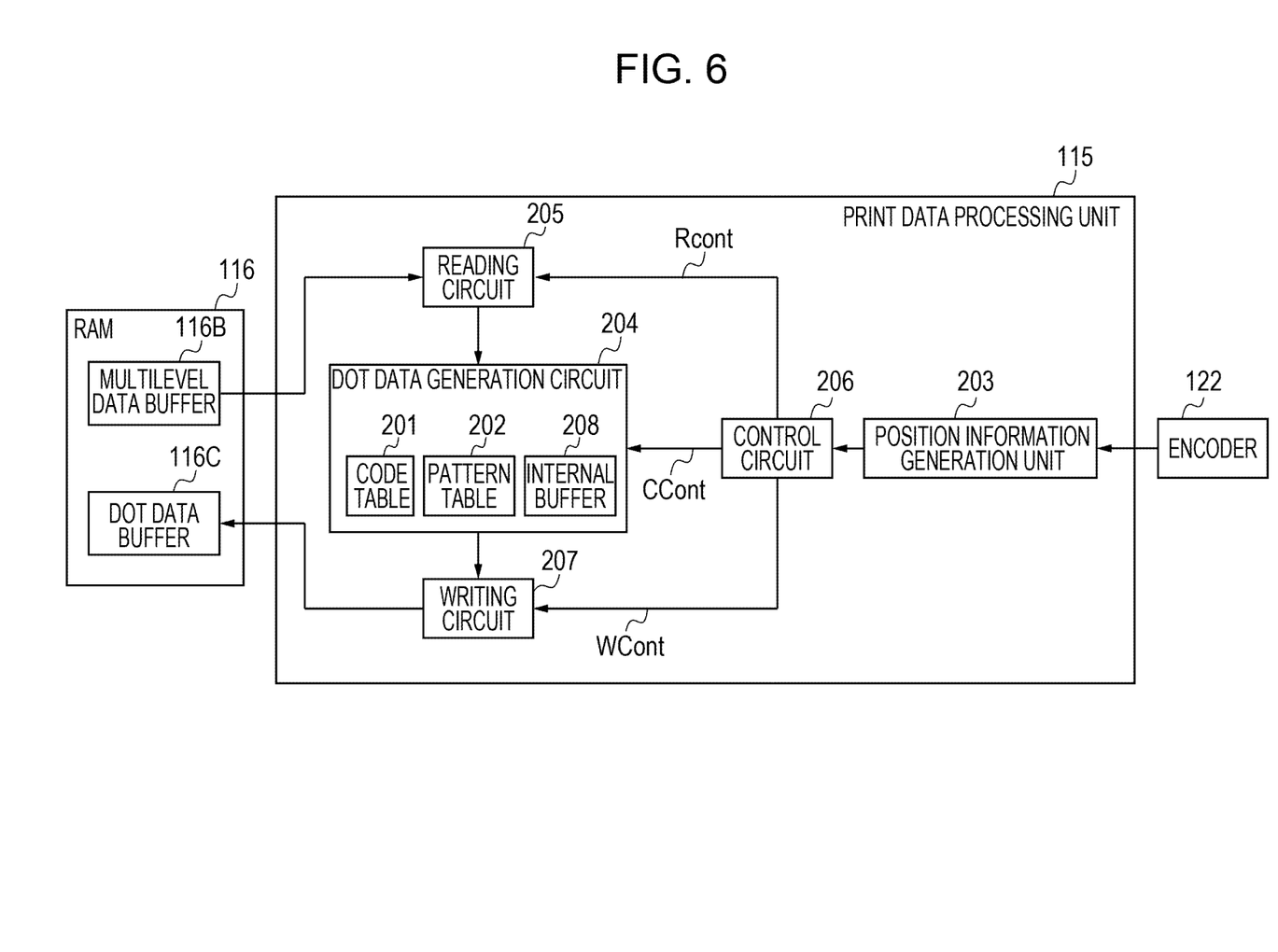
FIG. 6 is a diagram illustrating a configuration of a print data processing unit.

FIG. 4 is a flow chart illustrating a process associated with line data including 24 pieces of multilevel data MD. In step S401, a determination is made as to whether it is to perform the process associated with the line data. If the answer to step S401 is YES, then the process proceeds to step S402. In step S402, a starting address (X and Y positions) of multilevel data stored in the multilevel data buffer 116B, shown in FIGS. 2, 3 and 6, is acquired. In step S403, multilevel data is read from the multilevel data buffer 116B. In step S404, a level of the multilevel data is detected, and a table corresponding to the detected level is selected. An address of a code set CDS to be used is calculated for the selected table. In step S405, the code set CDS is read based on the calculated address. In step S406, pattern data PD is acquired from codes included in the code set CDS based on the pattern table 202, shown in FIGS. 3 and 6. Dot data DD corresponding to the pattern data PD is then produced and stored in an internal buffer 208, shown in FIG. 6. In step S407, a determination is made as to whether the conversion is completed for all pixels included in the line data. If the answer to step S407 is YES, then the process proceeds to step S409. In step S409, the dot data temporarily stored in the internal buffer 208 is transferred to the dot data buffer 116C, shown in FIGS. 2 and 6, and stored therein. The processing flow then returns to step S401 to wait for a next process. In a case where the answer to step S407 is NO, in step S408, the Y position of data to be processed is incremented by one pixel, and then the processing flow returns to step S404 to repeat the process from step S404. Thus, as described above with reference to FIG. 3, the multilevel data of one line including 24 pixels (600 ppi) is converted into two lines of data each including 48 dots (1200 dpi), and stored in the dot data buffer 116C.

Thus, the multilevel data MD is converted into dot data DD on a pixel-by-pixel basis in the above-described manner.

Figure 5:
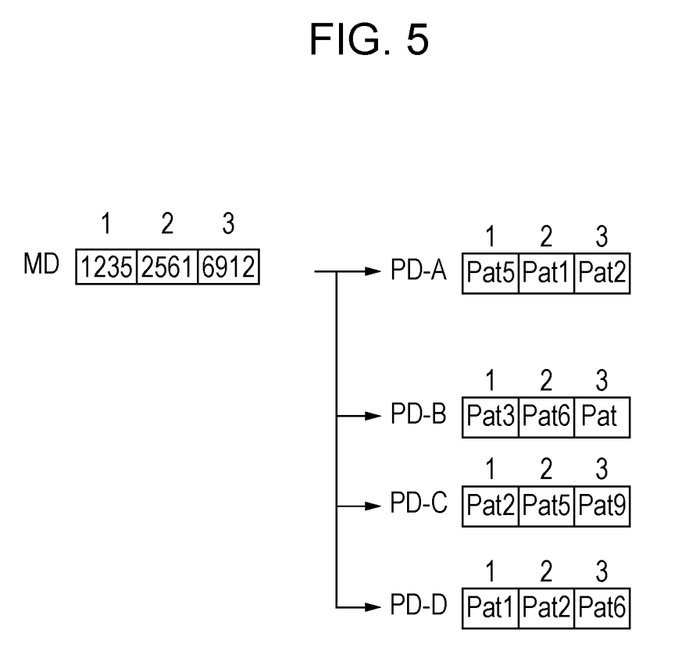
FIG. 5 is a diagram illustrating a process performed by a print data processing unit.

Referring to FIG. 5, a further description is given below as to the process of acquiring pattern data described above with reference to FIG. 4 before the dot data DD is acquired. For simplicity of illustration, it is assumed that the line data to be processed includes three pixels specified by addresses of X=0 and Y=0, X=0 and Y=1, and X=0 and Y=2, and the gray level is 7 for all three pixels.

Referring again to FIG. 3, a first pixel (X=0 and Y=0) is assigned a code set CDS of "1235", and thus Pat5, Pat3, Pat2, and Pat1 are acquired as pattern data (PD-A to PD-D) for the array A, the array B, the array C, and the array D. A second pixel (X=0 and Y=1) is assigned a code set CDS of "2561", and thus Pat1, Pat6, Pat5, and Pat2 are acquired as pattern data for the array A, the array B, the array C, and the array D. A third pixel (X=0 and Y=2) is assigned a code set CDS of "6912", and thus Pat2, Pat1, Pat9, and Pat6 are acquired as pattern data for the array A, the array B, the array C, and the array D. By performing the above-described process, pattern data (PD-A to PD-D) is acquired for the respective arrays as shown in FIG. 5.

FIG. 6 is diagram illustrating a control blocks of the print data processing unit 115. A signal output from the encoder 122 is sent to the print data processing unit 115. A control circuit 206 controls the print data processing unit 115. More specifically, the control circuit 206 outputs a control signal such as an address signal based on address information ADDR or a timing signal generated by the position information generation unit 203. The control circuit 206 manages addresses indicating locations of data to be accessed in the multilevel data buffer 116B or in the dot data buffer 116C. A reading circuit 205 reads data from the multilevel data buffer 116B based on a signal RCont supplied from the control circuit 206. A dot data generation circuit 204 generates dot data DD according to the code table 201 and the pattern table 202 based on a signal CCont supplied from the control circuit 206. The dot data generation circuit 204 includes a buffer 208 to store the generated dot data DD. A writing circuit 207 transfers the dot data DD stored in the buffer 208 to the dot data buffer 116C and stores the dot data DD therein based on a signal WCont supplied from the control circuit 206.

Figure 1C:
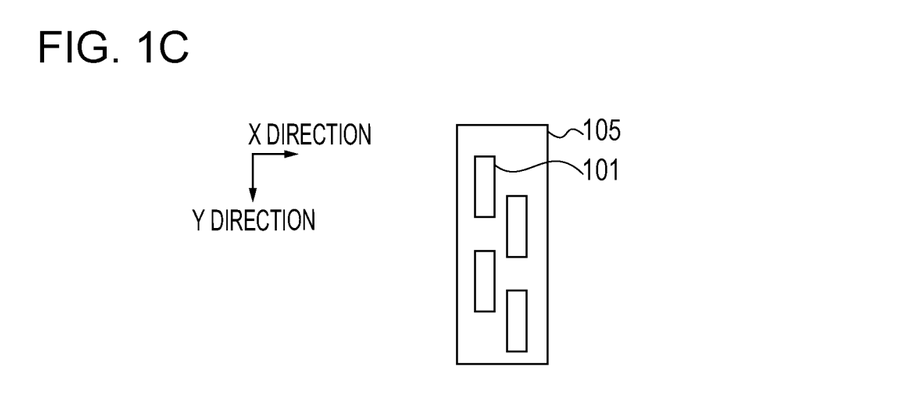
Figure 7A:
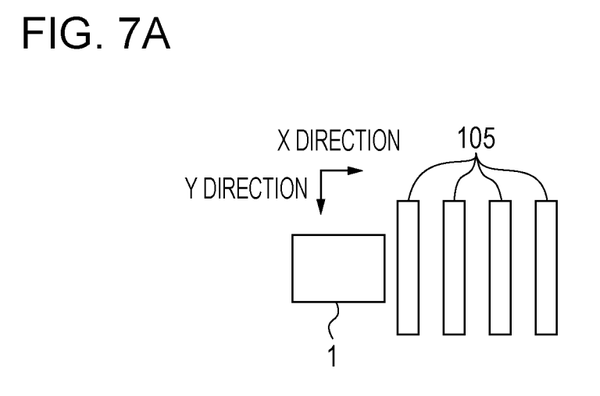
FIGS. 7A and 7B are diagrams illustrating a recording apparatus.
Figure 7B:
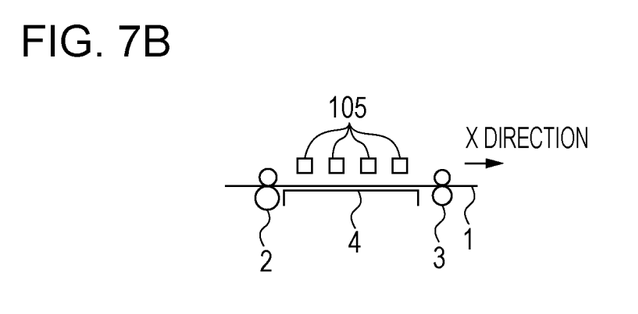

FIG. 7A is a plan view and FIG. 7B is a cross-sectional view illustrating a recording apparatus configured to perform recording using the recording head units 105 shown in FIG. 1C disposed in a direction in which paper 1 is conveyed while the paper 1 is conveyed in the X direction. In FIG. 7B, the paper (recording medium) 1 is conveyed by a pair of conveying rollers 2 and 3. When the paper is located on a platen 4, ink is discharged to the paper from the recording heads 101 of the recording head units 105 according to the dot data DD. For example, a rotary encoder (not shown) may be disposed to output a signal in response to a rotation (operation) of the conveying rollers, and the CPU 117 may control the conveying of the paper in accordance with the signal output from the encoder.

OTHER EMBODIMENTS

In the embodiments described above, the dot data generation circuit 204 includes the buffer 208 to temporarily store the dot data DD. Alternatively, the dot data DD generated by the dot data generation circuit 204 may be directly stored in the dot data buffer 116C without temporarily storing the dot data DD in the buffer 208.

In the embodiments described above, the transfer unit 121 transfers the dot data DD from the dot data buffer 116C to the recording heads 101. Alternatively, the transfer unit 121 may directly transfer the dot data DD from the dot data generation circuit 204 to the recording heads 101.

Note that there is no particular restriction on the number of recording element arrays disposed on the recording head as long as the number of recording element arrays disposed on the recording head is equal to the number of codes included in each code set. Furthermore, there is no particular restriction on the number of bits used to express each code or the number of bits of each code set as long as any code can be reached via a single access to the table.

A serial type recording apparatus is known. In this type of recording apparatus, recording is performed while a carriage with the recording head unit 104 shown in FIG. 1B mounted thereon is scanned in the X direction. The above-described embodiments of the present invention may be applied to such a recording apparatus. In this case, an encoder may be disposed to output a signal in response to scanning of the carriage (the recording head), and driving of the recording head and processing of image data may be performed based on the signal output from the encoder. In this recording apparatus, scanning of the recording head and pitch-conveying of paper in the Y direction may be performed alternately.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-041653 filed Feb. 26, 2010, which is hereby incorporated by reference herein in its entirety.

What is claimed is:

1. An apparatus configured to perform processing to form an image on a recording medium by using a recording head including a plurality of recording element arrays for one color component, each recording element array including a plurality of recording elements arranged therein, the apparatus comprising:
a first acquiring unit configured to acquire multilevel data;
a second acquiring unit configured to acquire position information of a conversion target pixel of the multilevel data acquired by the first acquiring unit;
a third acquiring unit configured to acquire a set of pattern information pieces corresponding to the conversion target pixel of the multilevel data acquired by the first acquiring unit based on the position information acquired by the second acquiring unit, wherein the set of pattern information pieces specifies a plurality of pieces of dot data that have each been assigned to a respective one of a plurality of recording element arrays different from each other for recording on the same position by the plurality of recording element arrays for one color component; and
a processing unit configured to convert the multilevel data into a plurality of pieces of dot data that have been assigned to each of the plurality of recording element arrays for each pixel, based on the pattern information pieces acquired by the third acquiring unit.

2. The apparatus according to claim 1, wherein the set of pattern information pieces is a code set including codes, each code corresponding to the plurality of recording element arrays, and
the processing unit sequentially converts the multilevel data into the plurality of pieces of dot data by using a table defining the plurality of pieces of dot data for the codes.

3. The apparatus according to claim 1, wherein the third acquiring unit acquires the set of pattern information pieces for each level of multilevel data acquired by the first acquiring unit.

4. The apparatus according to claim 1, wherein the third acquiring unit acquires the set of pattern information pieces from a table corresponding to a multilevel of the conversion target pixel of the multilevel data among a plurality of tables, based on position information acquired by the second acquiring unit.

5. The apparatus according to claim 4, wherein the third acquiring unit acquires an address of the table corresponding to the conversion target pixel based on position information acquired by the second acquiring unit and acquires a set of pattern information pieces based on the acquired address.

6. The apparatus according to claim 4, wherein each of the plurality of tables includes a plurality of sets of pattern information pieces.

7. The apparatus according to claim 4, wherein the apparatus holds the plurality of tables.

8. The apparatus according to claim 1, wherein the set of pattern information pieces includes a set of codes.

9. The apparatus according to claim 1, wherein the processing unit acquires a plurality of pieces of pattern data for specifying a position of dot to be recorded based on the set of pattern information pieces acquired by the third acquiring unit and converts the multilevel data into the plurality of pieces of dot data based on the acquired pattern data.

10. The apparatus according to claim 1, further comprising:
a transferring unit configured to transfer dot data converted by the processing unit to a corresponding recording element array.

11. The apparatus according to claim 1, further comprising:

a control unit configured to control recording by the recording head based on dot data converted by the conversion unit.

12. The apparatus according to claim 1, wherein the processing unit converts the multilevel data into the plurality of pieces of dot data that have been assigned to the plurality of recording element arrays based on the pattern information pieces acquired by the third acquiring unit and a pattern table including a plurality of pieces of pattern data for specifying a position of dot to be recorded.

13. The apparatus according to claim 1, further comprising the recording head.

14. A method for performing processing to form an image on a recording medium by using a recording head including a plurality of recording element arrays for one color component, each recording element array including a plurality of recording elements arranged therein, the method comprising:

acquiring multilevel data;

acquiring position information of a conversion target pixel of the acquired multilevel data;

acquiring a set of pattern information pieces corresponding to the conversion target pixel of the acquired multilevel data based on the acquired position information, wherein the set of pattern information pieces specifies a plurality of pieces of dot data that have each been assigned to a respective one of a plurality of recording element arrays different from each other for recording on the same position by the plurality of recording element arrays for one color component; and converting the multilevel data into a plurality of pieces of dot data that have been assigned to each of the plurality of recording element arrays for each pixel, based on the acquired pattern information pieces.

* * * * *